United States Patent
Kim et al.

(10) Patent No.: US 9,516,124 B2
(45) Date of Patent: Dec. 6, 2016

(54) METHOD AND APPARATUS FOR UPDATING AND PROVIDING PRESENCE INFORMATION BASED ON POSITION INFORMATION

(75) Inventors: Min Su Kim, Gyeonggi-do (KR); Young Ki Jeon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 166 days.

(21) Appl. No.: 12/568,309

(22) Filed: Sep. 28, 2009

(65) Prior Publication Data
US 2010/0082726 A1    Apr. 1, 2010

(30) Foreign Application Priority Data
Sep. 26, 2008    (KR) .................. 10-2008-0094684

(51) Int. Cl.
*H04L 29/08*    (2006.01)
*H04W 4/02*    (2009.01)
(Continued)

(52) U.S. Cl.
CPC ............... *H04L 67/24* (2013.01); *H04L 67/18* (2013.01); *H04W 4/02* (2013.01); *H04M 1/72572* (2013.01); *H04M 3/42365* (2013.01)

(58) Field of Classification Search
CPC ..... H04L 67/18; H04L 67/24; H04M 1/72572; H04M 3/42365
(Continued)

(56) References Cited

U.S. PATENT DOCUMENTS

| | | | | |
|---|---|---|---|---|
| 6,668,173 | B2 * | 12/2003 | Greene | .................. H04W 8/14 455/445 |
| 7,107,312 | B2 * | 9/2006 | Hackbarth et al. | ........... 709/204 |

(Continued)

FOREIGN PATENT DOCUMENTS

| | | |
|---|---|---|
| CN | 1794706 | 6/2006 |
| CN | 1910646 | 2/2007 |

(Continued)

OTHER PUBLICATIONS

Microsoft® Computer Dictionary, by: Microsoft Press, Publisher: Microsoft Press, Pub. Date: Mar. 15, 2002, Print ISBN-13: 978-0-7356-1495-6, Print ISBN-10: 0-7356-1495-4.*

(Continued)

*Primary Examiner* — Jimmy H Tran
(74) *Attorney, Agent, or Firm* — The Farrell Law Firm, P.C.

(57) ABSTRACT

A presence service providing system and method is disclosed that provides presence information regarding presentities to watchers. The presence system sets mapping information, which contains the presence information that matches position information corresponding to at least one presentity. When the position information is received via a positioning system, the presence system detects the presence information, which matches the received position information, from the set mapping information. The detected presence information is transmitted from the presence system to a watcher. The presence service providing system can provide a variety of presence information according to the location of the presentity, so that watchers can more specifically and clearly identify the states of the presentity from the presence information.

16 Claims, 8 Drawing Sheets

(51) Int. Cl.
*H04M 1/725* (2006.01)
*H04M 3/42* (2006.01)

(58) Field of Classification Search
USPC .......................................... 709/201, 204, 207
See application file for complete search history.

(56) References Cited

U.S. PATENT DOCUMENTS

| | | | | |
|---|---|---|---|---|
| 7,886,013 | B2* | 2/2011 | Christoffersson | H04Q 3/0091 709/206 |
| 8,050,690 | B2* | 11/2011 | Neeraj | 455/456.1 |
| 8,583,079 | B2* | 11/2013 | Chawla | 455/410 |
| 8,620,869 | B2* | 12/2013 | Consul | G06Q 10/107 707/662 |
| 2002/0035605 | A1* | 3/2002 | McDowell | H04L 12/581 709/206 |
| 2003/0018747 | A1* | 1/2003 | Herland et al. | 709/218 |
| 2004/0189701 | A1* | 9/2004 | Badt, Jr. | 345/753 |
| 2004/0243941 | A1 | 12/2004 | Fish | |
| 2005/0009542 | A1* | 1/2005 | Oprescu-Surcobe | H04L 29/06 455/466 |
| 2005/0068167 | A1* | 3/2005 | Boyer et al. | 340/531 |
| 2005/0071435 | A1* | 3/2005 | Karstens | H04L 12/581 709/207 |
| 2005/0108331 | A1* | 5/2005 | Osterman | H04L 29/06 709/204 |
| 2005/0165584 | A1* | 7/2005 | Boody et al. | 702/186 |
| 2006/0099911 | A1* | 5/2006 | Shibuya | H04W 60/00 455/41.2 |
| 2006/0206560 | A1* | 9/2006 | Kanada | 709/201 |
| 2007/0150605 | A1* | 6/2007 | Christoffersson | H04Q 3/0091 709/228 |
| 2007/0167170 | A1* | 7/2007 | Fitchett | H04L 29/06027 455/456.1 |
| 2007/0253340 | A1* | 11/2007 | Varney | H04L 67/24 370/252 |
| 2008/0114776 | A1 | 5/2008 | Sun et al. | |
| 2008/0228294 | A1* | 9/2008 | Nielsen | G01C 15/02 700/58 |
| 2009/0066510 | A1* | 3/2009 | Kamdar | H04M 1/72572 340/572.1 |
| 2009/0210802 | A1* | 8/2009 | Hawkins et al. | 715/753 |

FOREIGN PATENT DOCUMENTS

| | | |
|---|---|---|
| EP | 1 511 270 | 3/2005 |
| KR | 1020050051227 | 6/2005 |
| KR | 1020070122034 | 12/2007 |
| KR | 100831033 | 5/2008 |

OTHER PUBLICATIONS

Andrew Silver et al., "Unified Network Presence Management", Nortel Networks Wireless Solutions, Jan. 1, 2000.

* cited by examiner

```
    user : public user ID (SIP URI)

location presence mapping
meeting room : {x₁, x₂, y₁, y₂}, 5m, "meeting", call impossible        //meeting room
- next transition : -10m, "working", call possible
home {: x₃, x₄, x₅, x₆, y₃, y₄, y₅, y₆}, 0s, "RESTING", call impossible   //home
office : {x₇, y₇}, 0s, "working", call possible                        //office call possible : office
call impossible : meeting room, home
```

METHOD AND APPARATUS FOR UPDATING AND PROVIDING PRESENCE INFORMATION BASED ON POSITION INFORMATION

PRIORITY

This application claims priority under 35 U.S.C. §119(e) to an application entitled "METHOD AND APPARATUS FOR UPDATING AND PROVIDING PRESENCE INFORMATION BASED ON POSITION INFORMATION" filed in the Korean Intellectual Property Office on Sep. 26, 2008 and assigned Serial No. 10-2008-0094684, the contents of which are incorporated herein by reference.

BACKGROUND OF THE INVENTION

1. Field of the Invention

The present invention relates to communication service, and more particularly, to a method and apparatus that updates and provides presence information.

2. Description of the Related Art

In general, a presence service refers to a service that provides presence information of a user to other users in order to identify the user's states, for example, a physical location, a communication state, communication media, etc. Presentity refers to a user, i.e., an entity that provides presence information. Watcher refers to the other user, i.e., an entity that requests presence information about a presentity. Watchers can identify a change in the presence information of presentities through the presence service.

In the presence service, presence information is formed by simply combining data about a state of a presentity. Examples of the state of a presentity are a physical location, a communication state, communication media, etc. Watchers can individually identify a physical location, a communication state, communication media, etc. of a presentity, through presence information. Watchers, however, have difficulty clearly and specifically identifying the states of a presentity from presence information. Therefore, a presence service is needed to provide presence information with a more complex structure.

SUMMARY OF THE INVENTION

The present invention has been made in view of the above problems, and provides a method and apparatus for updating presence information based on position information.

In accordance with an embodiment of the present invention, the present invention provides a method for updating presence information based on position information of a presence server, the method includes receiving the position information and presence information regarding at least one presentity; registering the received position information and presence information which match with each other corresponding to the at least one presentity; and updating, when a change of at least one of the registered position information and presence information is requested, the registered position information and presence information by changing the at least one of the registered position information and presence information.

In accordance with an embodiment of the present invention, the present invention provides an apparatus for updating presence information based on position information, the apparatus includes at least one presentity; a presence server for receiving the position information and presence information regarding the at least one presentity, registering the received position information and presence information which match with each other corresponding to the at least one presentity, and updating, when a change of at least one of the registered position information and presence information is requested, the registered position information and presence information by changing the at least one of the registered position information and presence information.

The present invention further provides a method and apparatus for providing presence information based on position information.

In accordance with another embodiment of the present invention, the present invention provides a method for providing presence information based on position information of a presence server, the method includes storing the presence information which matches the position information regarding at least one presentity; receiving a request for the presence information regarding the at least one presentity from at least one watcher; and transmitting the presence information and position information regarding the at least one presentity in response to the request to the at least one watcher.

In accordance with another embodiment of the present invention, the present invention provides an apparatus for providing presence information based on position information, the apparatus includes at least one presentity; a presence server for storing the presence information which matches the position information regarding the at least one presentity, receiving a request for the presence information regarding the at least one presentity, and transmitting the presence information and position information regarding the at least one presentity in response to the request; and at least one watcher for transmitting the request to the presence server and receiving the presence information and position information regarding the at least one presentity in response to the request.

In accordance with another embodiment of the present invention, the present invention provides a method for providing presence information based on position information, the method includes detecting the position information regarding a presentity; matching the detected position information with the presence information corresponding to the presentity; and transmitting the matched position information and presence information to a presence server.

BRIEF DESCRIPTION OF THE DRAWINGS

The features and advantages of the present invention will become more apparent from the following detailed description in conjunction with the accompanying drawings, in which.

DETAILED DESCRIPTION OF EXEMPLARY EMBODIMENTS

Hereinafter, exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the present invention.

Figure 1:
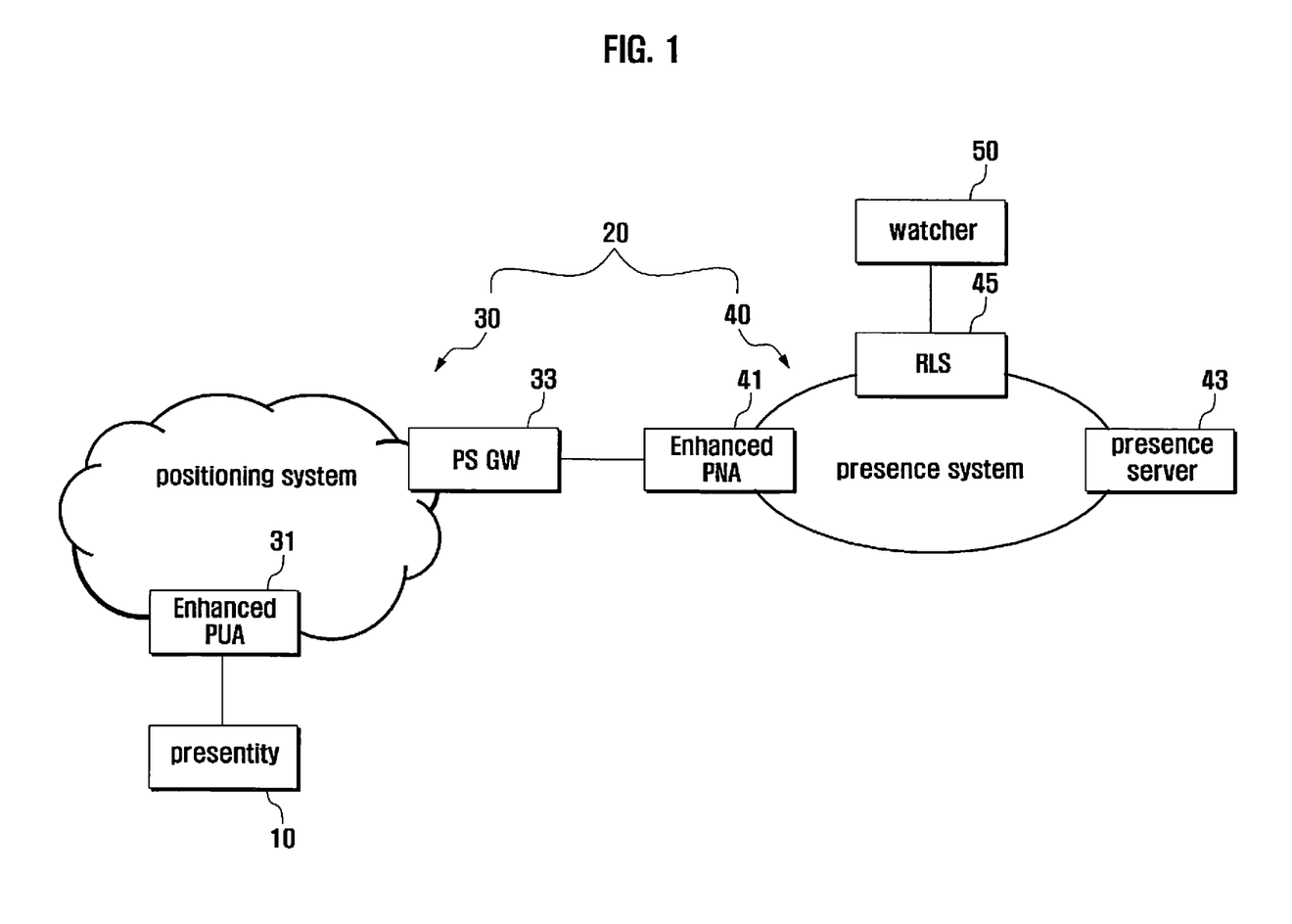
FIG. 1 is a block diagram illustrating a presence service providing system according to an embodiment of the present invention.

FIG. 1 is a block diagram illustrating a presence service providing system according to an embodiment of the present invention.

Referring to FIG. 1, the presence service providing system 20 provides presence information about presentities 10 to watchers 50. Although described herein in the plural, the present invention can comprise a single presentity and/or a single watcher. The presence service providing system 20 includes a positioning system 30 and a presence system 40. The positioning system 30 and presence system 40 communicate with each other via Session Initial Protocol (SIP), HyperText Transfer Protocol (HTTP), etc. The presence system 40 and the watchers 50 can also be communicated with each other via SIP, HTTP, etc.

The positioning system 30 collects position information about the presentities 10 and transmits it to the presence system 40. The positioning system 30 includes a positioning agent 31 and a Positioning System GateWay (PSGW) 33. In an embodiment of the present invention, the positioning agent 31 is implemented with an Enhanced Presence User Agent (Enhanced PUA).

Position information is substantially collected by the positioning agent 31 of the positioning system 30. The positioning agent 31 processes position information according to the presentities 10. The position information includes identification data that is individually allocated to corresponding presentities 10 to distinguish among them, and coordinates data indicating the position coordinates of the corresponding presentities 10. The position information may further include time data indicating a point in time coordinate data of corresponding presentities 10 was detected. The positioning agent 31 transmits position information to the positioning system gateway 33 according to communication protocol of the positioning system 30.

The positioning system gateway 33 receives position information and then performs a transformation regarding the position information in order to conform to the communication protocol of the presence system 40. The positioning system gateway 33 converts position information according to communication protocol of the positioning system 30 into position information according to the communication protocol of the presence system 40. The positioning system gateway 33 transmits position information to the presence system 40 based on communication protocol of the presence system 40.

In the presence system 40, mapping information is set which has presence information that matches position information corresponding to the presentities 10. When the presence system 40 receives position information from the positioning system 30, the presence system 40 detects presence information, which matches position information, from the mapping information, and transmits the position information to the watchers 50. In an embodiment of the present invention, the presence system 40 is implemented with an Internet protocol Multimedia Subsystem (IMS). The presence system 40 includes a presence agent 41, a presence server 43, and a Resource List Server (RLS) 45. In an embodiment of the present invention, the presence agent 41 is implemented with an enhanced Presence Network Agent (enhanced PNA).

The presence agent 41 stores mapping information set by presentities 10. The mapping information contains identification data of corresponding presentities 10, virtual coordinate data, and presence information set by virtual coordinate data. The presence information contains location data determined by coordinate data to distinguish among the coordinate data. The location data may be a meeting room, house, school, etc. The presence information may further contain communication intention data indicating whether communication is performed at respective coordinate data. The communication intention data may be call impossible, call possible, etc. The communication intention data may be determined differently according to time intervals. The mapping information serves as a determination reference of the communication intention data according to the coordinate data and may further contain time interval data.

The presence agent 41 receives position information and then detects presence information, which matches the position information, from the mapping information. That is, the presence agent 41 detects presence information corresponding to the coordinate data of the position information. In addition, the presence agent 41 can detect the presence information using point in time data of the position information. The presence agent 41 transmits the presence information to the presence server 43, together with identification data of corresponding presentities 10.

The presence server 43 receives the presence information and then stores and manages the presence information in association with the corresponding presentities 10. That is, the presence server 43 stores presence information according to the identification data of the corresponding presentities 10. If the presence information related to the corresponding presentities 10 has been previously stored in the presence server 43, the presence server 43 updates the stored presence information. After that, the presence server 43 transmits the presence information to the resource server 45. The presence server 43 is embodied as hardware or a combination of hardware and software.

The resource server 45 stores and manages an interest list of presentities 10 as an entity of a watcher, according to the watchers 50. The interest list is composed of identification data of presentities 10. When the resource server 45 detects a presence information request of a particular watcher, the resource server 45 requests presence information regarding the presentities 10 corresponding to an interest list by the particular watcher from the presence server 43. When the resource server 45 receives presence information from the presence server 43, the resource server 45 searches for an interest list containing the identification data of the corresponding presentities 10 and then transmits the presence information to the watcher corresponding to the interest list. The resource server 45 can transmit presence information regarding a single presentity 10 to a plurality of watchers 50.

Figure 2:
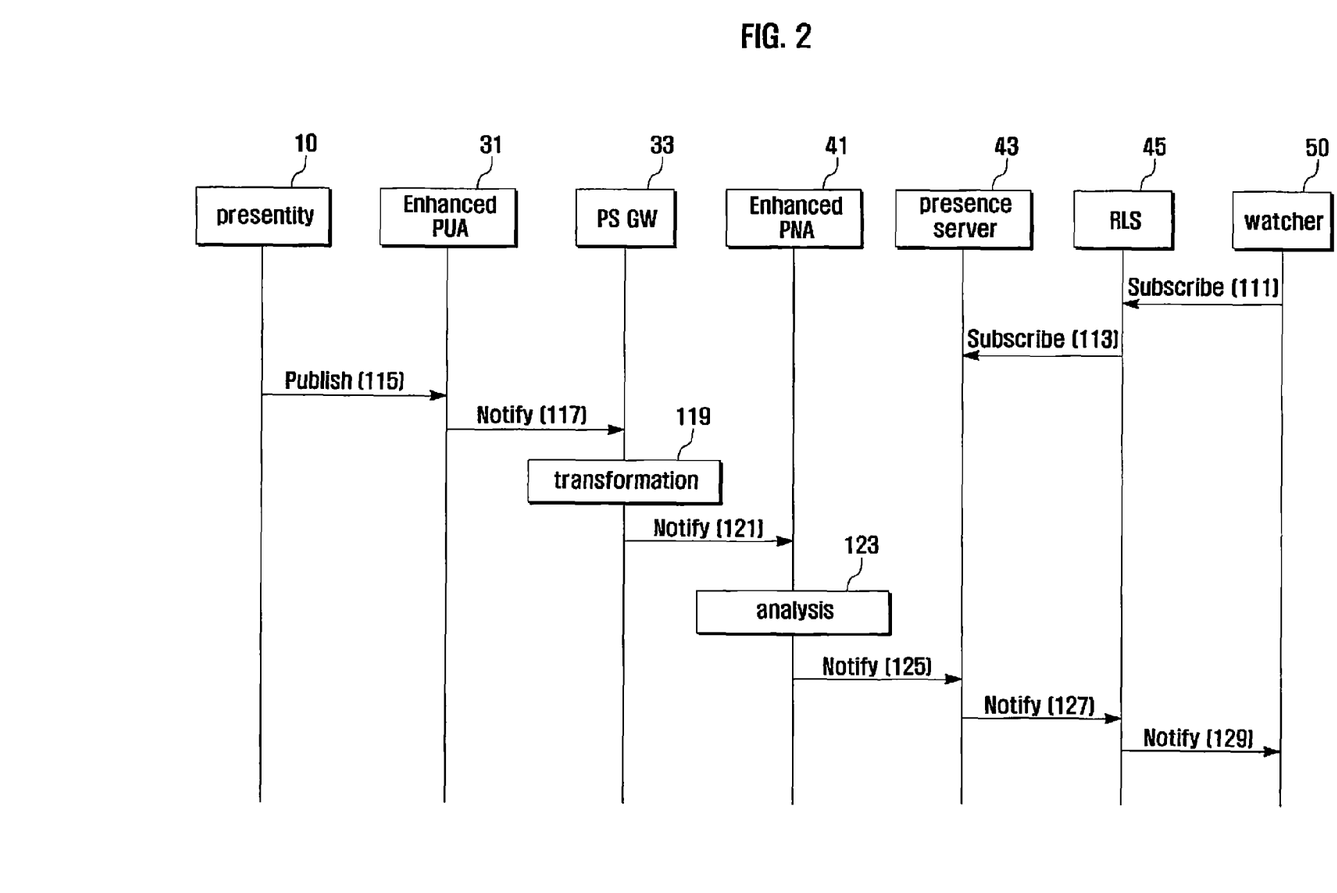
FIG. 2 is a signal flow chart describing a presence service providing procedure according to an embodiment of the present invention.

FIG. 2 is a signal flow chart describing a presence service providing procedure according to an embodiment of the present invention.

Referring to FIG. 2, the presence service providing procedure starts at step 111 with requesting, by a watcher 50, presence information from a resource server 45. When the resource server 45 detects the presence information request, the resource server 45 requests the presence information regarding the presentities 10, which correspond to an interest list of a corresponding watcher 50, from the presence server 43 at step 113.

On the other hand, the presence service providing procedure may also start with notifying, by the presentity 10, the positioning agent 31 of its current position as at step 115. When the positioning agent 31 detects the current position of the presentity 10, the positioning agent 31 determines the position information regarding the presentity 10 and then transmits the position information to the positioning system gateway 33 at step 117. The positioning agent 31 transmits the position information to the positioning system gateway 33 according to the communication protocol of the positioning system 30. When the positioning system gateway 33 detects the position information, the positioning system gateway 33 performs a transformation for the detected position information according to the communication protocol of the presence system 40 at step 119. The positioning system gateway 33 also transmits the position information to the presence agent 41 according to the communication protocol of the presence system 40 at step 121. When the presence agent 41 receives the position information, the presence agent 41 analyzes the received position information at step 123. The presence agent 41 detects the presence information, which matches the position information, from mapping information. After that, the presence agent 41 transmits the presence information to the presence server 43 at step 125.

When the presence server 43 detects the presence information request and then receives the presence information, the presence server 43 transmits the presence information to the resource server 45 at step 127. When the resource server 45 receives the presence information, the resource server 45 transmits the received presence information to the watcher 50 at step 129.

As described above, the presence service providing system 20, according to an embodiment of the present invention, can provide presence services as the positioning system 30 and the presence system 40 are connected to and communicating with each other via the positioning system gateway 33 and the presence agent 41. In the following description, the presence service providing procedure, performed in the presence agent 41 and the positioning system gateway 33, is explained in detail with reference to the accompanying drawings.

Figure 3:
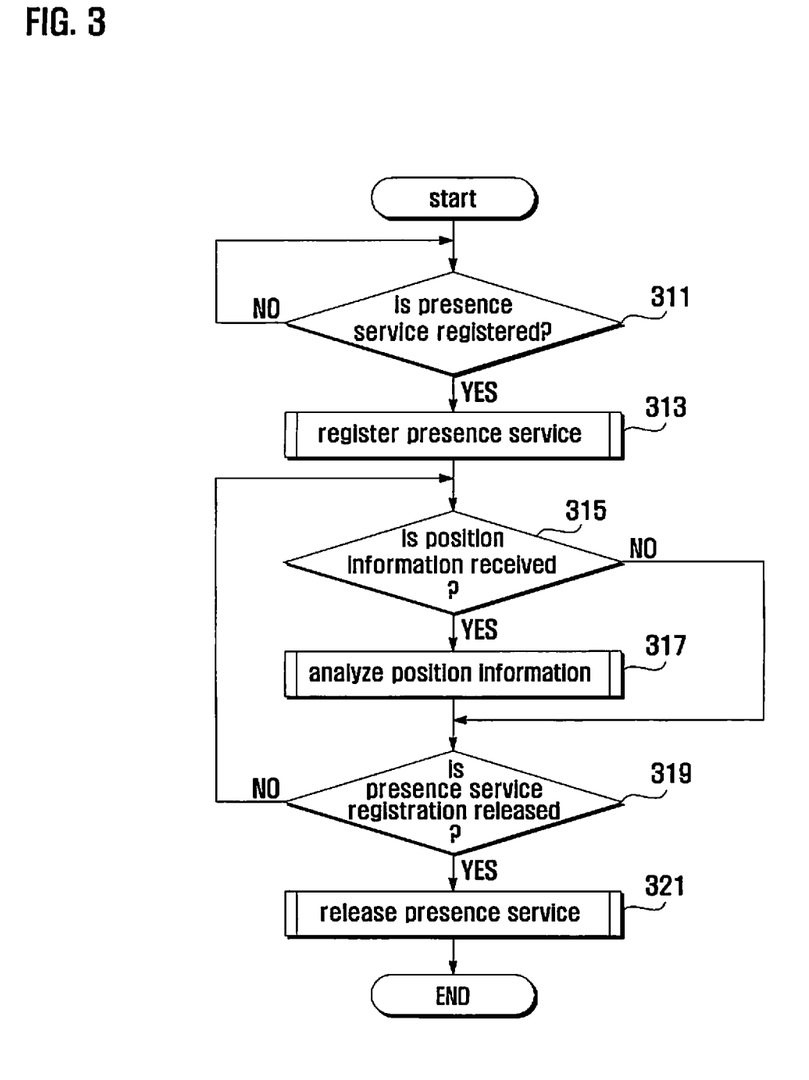
FIG. 3 is a flow chart describing a presence service providing procedure performed in a presence agent of the presence service providing system according to an embodiment of the present invention.

FIG. 3 is a flow chart describing a presence service providing procedure performed in a presence agent of the presence service providing system according to an embodiment of the present invention.

Referring to FIG. 3, when a particular presentity 10 requests a presence service registration, the presence agent 41 detects the request at step 311. The presence agent 41 then performs a process of registering a presence service to detect presence information regarding the presentity 10 at step 313. The presence agent 41 sets mapping information according to the presentities 10. The presence agent 41 may be communicating with the presentity 10 in order to perform a presence service registration via an additional communication system (not shown) separated from the presence service providing system 20. The presence agent 41 is connected to and communicating with the positioning system 30 to collect the position information regarding the presentity 10.

The presence service registration process at step 313, performed by the presence agent 41, is explained in detail with reference to FIGS. 4 and 5.

Figure 4:
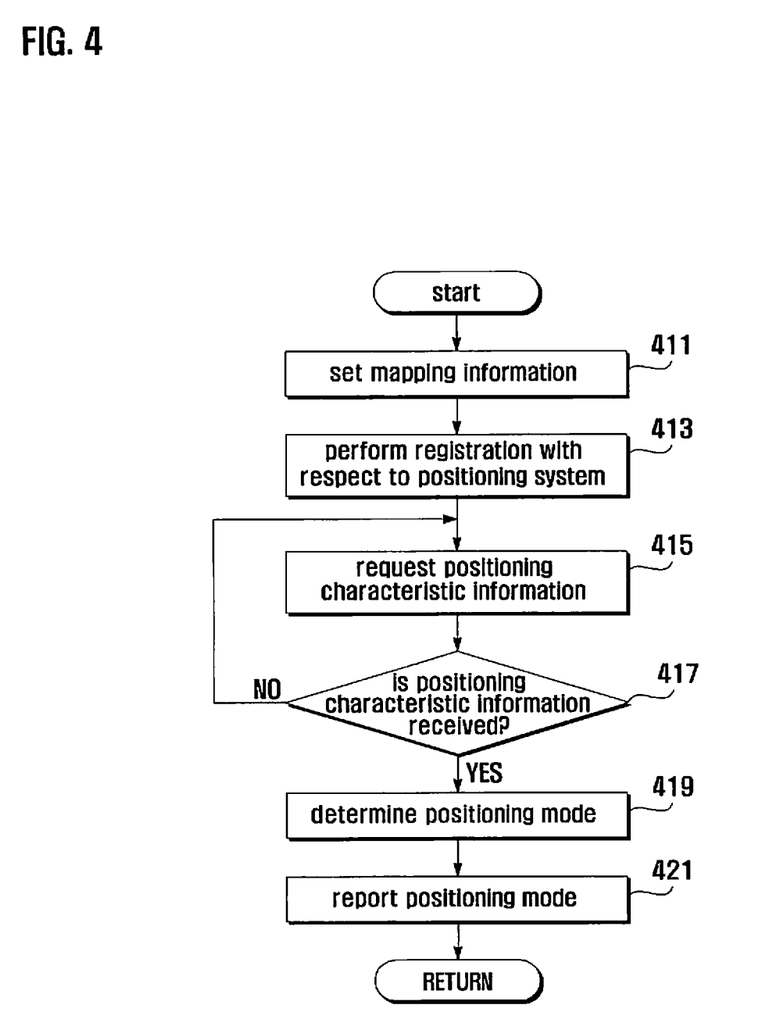
FIG. 4 is a flow chart describing a presence service registering process shown in FIG. 3.
Figure 5:
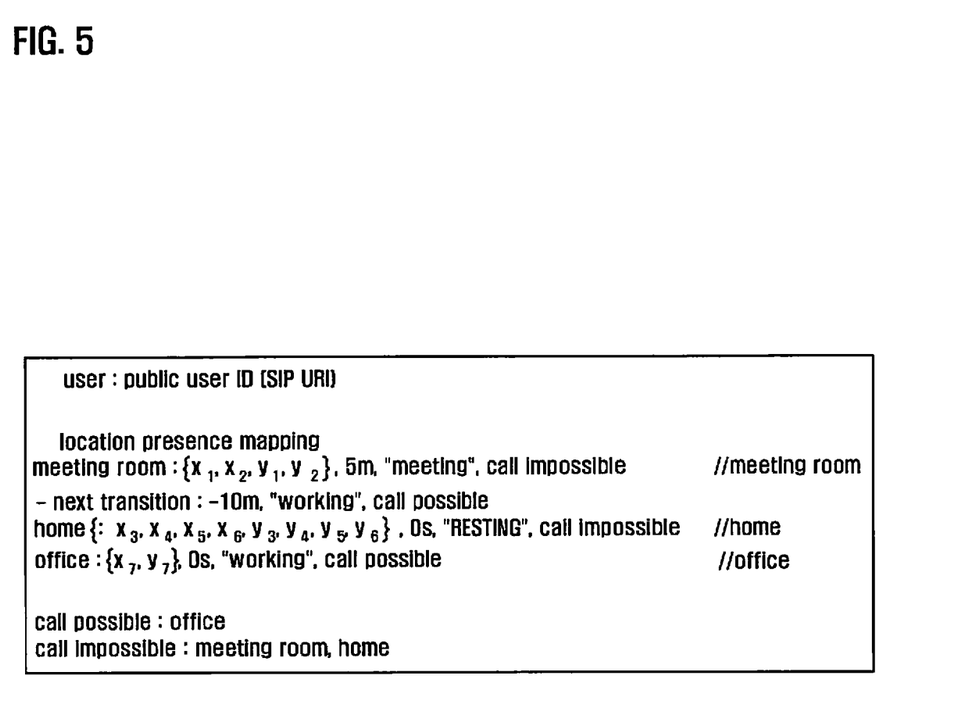
FIG. 5 is a diagram illustrating a format of mapping information set when a presence service is registered through the procedure of FIG. 3.

FIG. 4 is a flow chart describing a presence service registering process of step 313 shown in FIG. 3, and FIG. 5 is a diagram illustrating a format of mapping information set when a presence service is registered through the procedure of FIG. 3.

Referring to FIG. 4, the presence agent 41 sets mapping information at step 411. When the presence agent 41 detects a presence service registering request of the particular presentity 10, the presence agent 41 sets mapping information corresponding to the presentity 10 as shown in FIG. 5, The mapping information contains the identification data of the presentity 10, virtual coordinate data, and the presence information set by the coordinate data.

The presence information contains the location data determined by the coordinate data in order to distinguish among the coordinate data. For example, in mapping information, location data 'a meeting room' is determined by coordinate data $\{x1, x2, y1, y2\}$, and location data 'a house' is determined by coordinate data $\{x3, x4, x5, x6, y3, y4, y5, y6\}$. The presence information may further contain communication intention data indicating whether communication is performed at respective coordinate data locations. For example, in the mapping information, the communication intention data 'call impossible' is determined by the location data 'a meeting room', and the communication intention data 'call impossible' is also determined by the location data 'a house'.

The communication intention data may be determined differently according to time intervals. The mapping information may further contain time interval data as a determination reference of the communication intention data determined by the coordinate data. For example, in the mapping information, the time interval data '5 min' and the communication intention data 'call impossible' can be determined by the location data 'a meeting room'. This mapping information indicates that the presentity 10 cannot perform a communication, if the position of the presentity 10 corresponds to coordinate data $\{x1, x2, y1, y2\}$ and the time interval data is greater than or equal to 5 minutes. On the other hand, in the mapping information, the time interval data '−10 min' and the communication intention data 'call possible' can be determined by the location data 'a meeting room'. This mapping information indicates that the presentity 10 can perform a communication, if the position of the presentity 10 is moved out of coordinate data $\{x1, x2, y1, y2\}$ and time interval data is greater than or equal to 10 minutes.

Next, the presence agent 41 performs registration and authentication with respect to the positioning system 30 to collect the position information regarding the presentity 10 at step 413. The presence agent 41 is connected to the positioning system gateway 33 of the positioning system 30. After that, the presence agent 41 requests the positioning characteristic information of the positioning system 30, for example, capability, from the positioning system gateway 33 at step 415. For example, the positioning characteristic information refers to data regarding position information storage or process capability of the positioning system 30.

The presence agent 41 determines whether to receive the positioning characteristic information from the positioning system gateway 33 at step 417. If the presence agent 41 detects the positioning characteristic information from the positioning system gateway 33 at 417, the presence agent 41 determines a positioning mode based on the positioning characteristic information at step 419. Examples of the positioning mode are an immediate positioning mode where the positioning system 30 transmits the position information to the presence agent 41 according to a periodic request of the presence agent 41, a periodic positioning mode where the positioning system 30 periodically transmits the position information to the presence agent 41, and an event positioning mode where the positioning system 30 transmits the position information to the presence agent 41 at a point in time when the position information is collected.

The presence agent 41 then notifies the positioning system gateway 33 of the positioning mode at step 421, and then returns to the procedure of FIG. 3.

On the other hand, if the presence agent 41 does not detect the positioning characteristic information from the positioning system gateway 33 at 417, the presence agent 41 returns to and proceeds with step 415.

Referring back to FIG. 3, after performing the presence service registration at step 313, the presence agent 41 determines whether to receive the position information regarding the presentity 10 registered in the presence service at step 315. When the presence agent 41 receives the position information regarding the presentity 10 at step 315, the presence agent 41 performs a process of analyzing position information at step 317. The presence agent 41 detects presence information, which matches the position information, from the mapping information, and then transmits the presence information to the presence server 43.

The position information analysis process at step 317, performed by the presence agent 41, is explained in detail with reference to FIG. 6.

Figure 6:
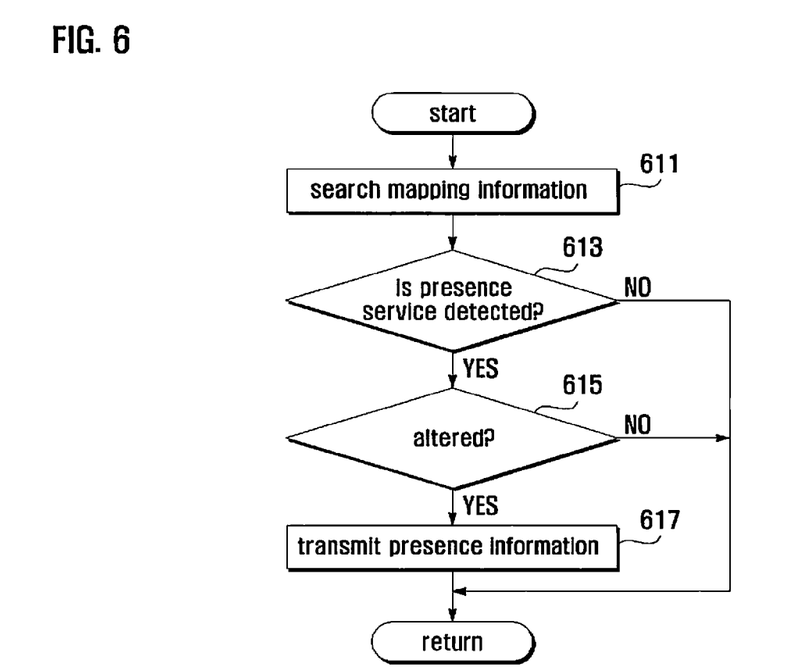
FIG. 6 is a flow chart describing a position information analyzing process shown in FIG. 3.

FIG. 6 is a flow chart describing a position information analyzing process shown in FIG. 3.

Referring to FIG. 6, the presence agent 41 searches for mapping information at step 611). That is, if the presence agent 41 receives position information, the presence agent 41 searches for the mapping information using the received position information. After that, the presence agent 41 determines whether to detect presence information, which matches the position information, from the mapping information at step 613. If the presence agent 41 detects presence information from the mapping information at 613, the presence agent 41 determines whether the presence information is changed in response to identification data of the position information at step 615. That is, the presence agent 41 determines whether coordinate data of the presentity 10 or the time interval data has changed. If the presence agent 41 ascertains that the presence information has changed at step 615, the presence agent 41 transmits the presence information to the presence server 43 at step 617, and then returns to the procedure of FIG. 3.

On the other hand, if the presence agent 41 does not detect presence information from the mapping information at step 613 or ascertains that the presence information has not changed at step 615, the presence agent 41 also returns to the procedure of FIG. 3.

Referring back to FIG. 3, after performing the position information analyzing process at step 317, the presence agent 41 determines whether a request is made to release the presence service registration of the presentity 10 registered in the presence service at step 319. If the presence agent 41 detects a request to release the presence service registration of the presentity 10 at step 319, the presence agent 41 performs a process of releasing a presence service registration of the presentity 10 at step 321. The presence agent 41 is disconnected from the positioning system 30 that collects the position information regarding the presentity 10. The presence agent 41 deletes mapping information regarding the presentity 10. The presence agent 41 is communicating with the presentity 10 to release the presence service registration via an additional communication system (not shown) separated from the presence service providing system 20.

The process of releasing a presence service registration at step 321, performed by the presence agent 41, is explained in detail with reference to FIG. 7.

Figure 7:
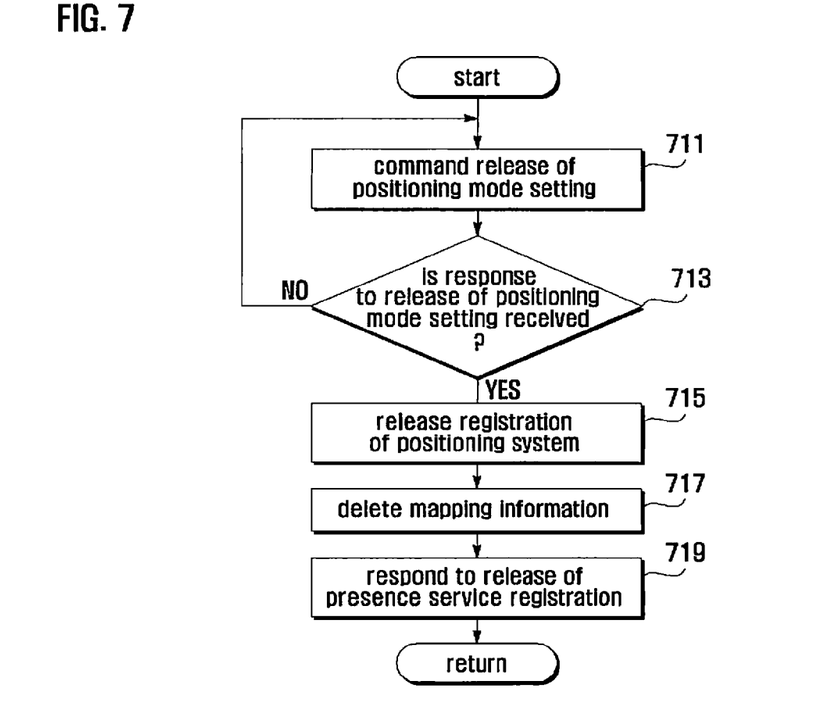
FIG. 7 is a flow chart describing a procedure of releasing presence service registration shown in FIG. 3.

FIG. 7 is a flow chart describing a process of releasing the presence service registration shown in FIG. 3.

Referring to FIG. 7, the presence agent 41 commands a release of the positioning mode setting to the positioning system gateway 33 at step 711. The presence agent 41 then determines whether to receive a response to the release of the positioning mode setting at step 713. If the presence agent 41 receives a response to the release of the positioning mode setting at step 713, the presence agent 41 performs a registration release with respect to the positioning system 30 at step 715. The presence agent 41 is disconnected from the positioning system gateway 33 of the positioning system 30. Afterwards, the presence agent 41 deletes the mapping information regarding the presentity 10 at step 717. The presence agent 41 transmits the response to the release of the presence service registration of the presentity 10 to the presence server 43 at step 719, and then returns to the procedure of FIG. 3.

On the other hand, if the presence agent 41 does not receive a response to the release of the positioning mode setting at step 713, the presence agent 41 returns to step 711.

When the presence service registration of the presentity 10 is released as shown in FIG. 3, the presence agent 41 terminates a presence service providing procedure with respect to the presentity 10.

On the other hand, referring to FIG. 3, when the presence agent 41 does not receive the position information regarding the presentity 10 at step 315, the presence agent 41 proceeds with step 319. In addition, if the presence agent 41 does not detect a request to release the presence service registration of the presentity 10 at step 319, the presence agent 41 returns to and proceeds with step 315.

Figure 8:
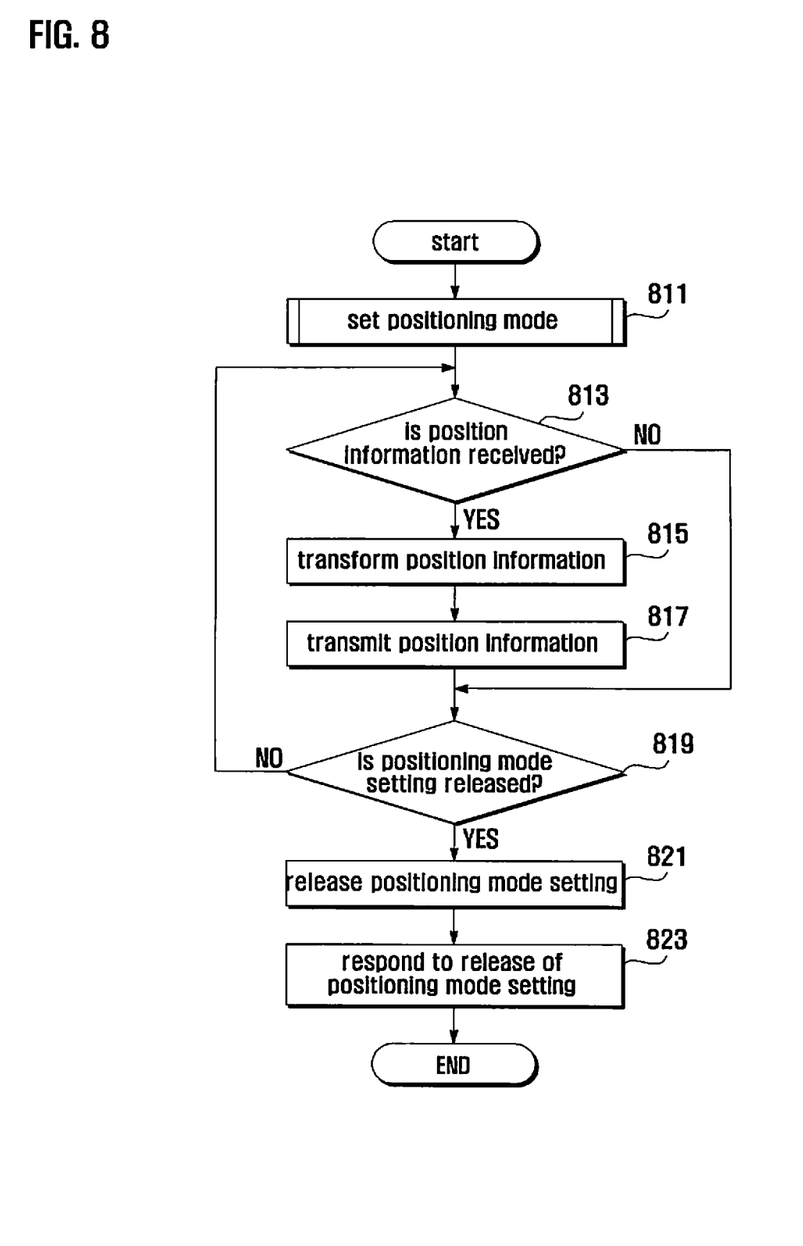
FIG. 8 is a flow chart describing a presence service providing procedure performed in a positioning system gateway of the presence service providing system according to an embodiment of the present invention.

FIG. 8 is a flow chart describing a presence service providing procedure performed in a positioning system gateway of the presence service providing system according to an embodiment of the present invention.

Referring to FIG. 8, the positioning system gateway 33 performs a positioning mode setting process at step 811. The positioning system gateway 33 is connected to and communicates with the presence system 40 and collects position information to transmit thereto.

Figure 9:
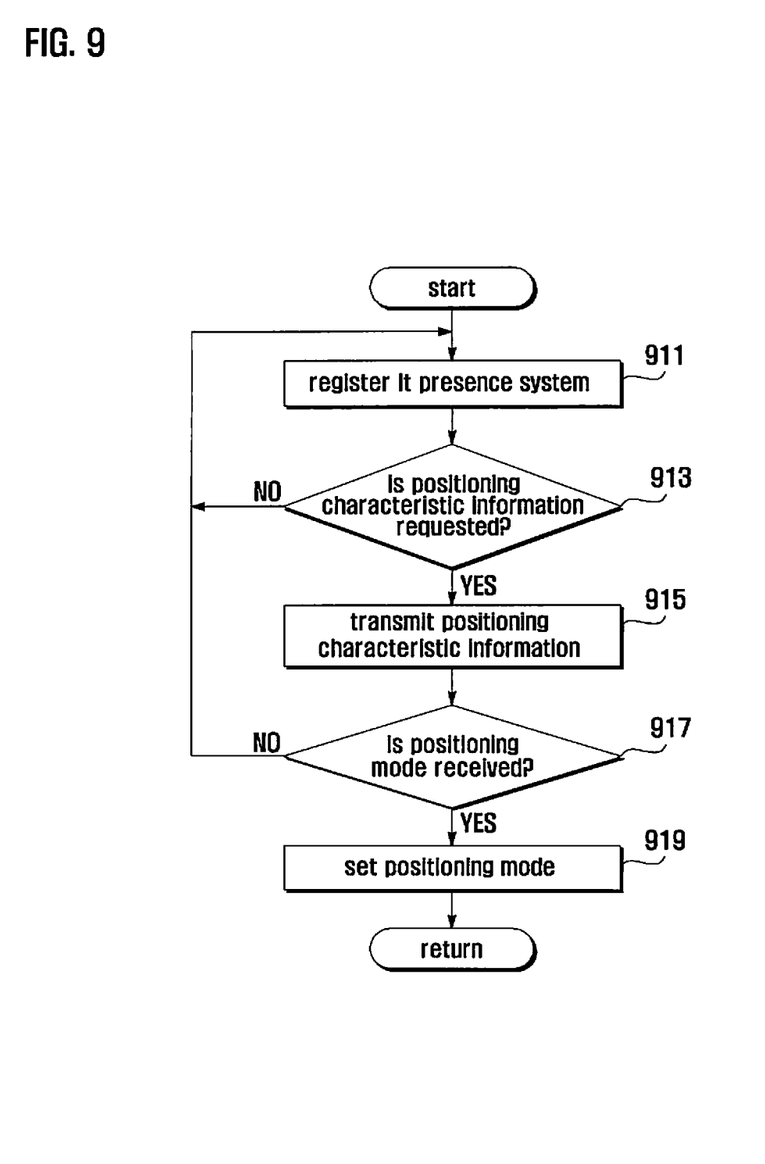
FIG. 9 is a flow chart describing a positioning mode setting process shown in FIG. 8.

The process of setting a positioning mode at step 811, performed by the positioning system gateway 33, is explained in detail with reference to FIG. 9. FIG. 9 is a flow chart describing a positioning mode setting process shown in FIG. 8.

Referring to FIG. 9, the positioning system gateway 33 performs the registration and the authentication with respect to the presence system 40 in order to provide position information thereto at step 911. The positioning system gateway 33 is connected to the presence agent 41 of the presence system 40. After that, the positioning system gateway 33 determines whether the presence agent 41 requests positioning characteristic information at step 913. If the positioning system gateway 33 ascertains that the presence agent requests the positioning characteristic information at step 913, the positioning system gateway 33 transmits the positioning characteristic information to the presence agent 41 at step 915. For example, the positioning characteristic information refers to data regarding the position information storage or the process capability of the positioning system 30.

After that, the positioning system gateway 33 determines whether to receive a positioning mode setting request from the presence agent 41 at step 917. If the positioning system gateway 33 receives a positioning mode setting request at step 917, the positioning system gateway 33 sets the positioning mode at step 919, and then returns to the procedure of FIG. 8. Examples of the positioning mode are an immediate positioning mode where the positioning system gateway 33 transmits the position information to the presence system 40 according to a periodic request of the presence system 40, a periodic positioning mode where the positioning system gateway 33 periodically transmits the position information to the presence system 40, and an event positioning mode where the positioning system gateway 33 transmits the position information to the presence system 40 at a point in time when the position information is collected.

On the other hand, if the positioning system gateway 33 ascertains that the presence agent 41 does not request the positioning characteristic information at step 913 or if the positioning system gateway 33 does receives a positioning mode setting request at step 917, the process returns to and proceeds with step 911.

Referring back to FIG. 8, after setting the positioning mode at step 811, the positioning system gateway 33 determines whether to receive position information regarding the presentity 10 at step 813. If the positioning system gateway 33 receives position information regarding the presentity 10 at 813, the positioning system gateway 33 transforms the position information at step 815. That is, the positioning system gateway 33 converts the position information according to the communication protocol of the positioning system 30 to position information according to the communication protocol of the presence system 40. After that, the positioning system gateway 33 transmits the position information to the presence system 40, according to the set positioning mode at step 817. For example, if the positioning system gateway 33 is set in an immediate positioning mode and detects a request of the presence system 40, the positioning system gateway 33 may transmit position information to the presence system 40. If the positioning system gateway 33 is set in a periodic positioning mode, the positioning system gateway 33 may periodically transmit position information to the presence system 40. If the positioning system gateway 33 is set in an event positioning mode, the positioning system gateway 33 receives position information and then transmits the position information to the presence system 40.

After that, the positioning system gateway 33 determines whether the presence system 40 commands to release the positioning mode setting at step 819. If the positioning system gateway 33 ascertains that the presence system 40 commands to release the positioning mode setting at step 819, the positioning system gateway 33 releases the positioning mode setting at step 821. Afterwards, the positioning system gateway 33 transmits a response to the release of the positioning mode setting to the presence system 40 at step 823, and then terminates the presence service providing procedure.

On the other hand, if the positioning system gateway 33 does not receive position information regarding the presentity 10 at step 813, the positioning system gateway 33 proceeds with step 819. If the positioning system gateway 33 ascertains that the presence system 40 does not release the positioning mode setting at step 819, the positioning system gateway 33 returns to and proceeds with step 813.

As described above, since the positioning system for collecting position information regarding presentities is connected to and communicating with the presence system that stores the presence information according to the position information regarding the presentities, the presence service providing system can provide the presence information based on the positions of the presentities. That is, the presence service providing system can more completely combine data regarding the states of the presentities, according to the positions of the presentities and thus provide the results as the presence information. Therefore, the presence service providing system according to the present invention can allow watchers to specifically and clearly identify the states of the presentities from the presence information.

As described above, the presence service providing system and method described herein can provide a variety of information according to the locations of a presentity. The presence service providing system can combine data about the states of a presentity, according to the locations of a presentity, and provide them as presence information, so that watchers can identify more specifically and clearly the states of the presentity through the presence information.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims.

What is claimed is:

1. A method for updating presence information of a terminal by a presence server, comprising:
   receiving presence information from the terminal, wherein the presence information comprises communication intention data being determined based on whether or not a staying time of the terminal is greater than or equal to a preset time interval, wherein the preset time interval is determined based on a location of the terminal, and wherein the communication intention data indicates whether communication is possible or not;
   storing the received presence information;
   updating the stored presence information if the presence information is different from previously stored presence information; and
   providing the presence information of the terminal to another terminal that requests the presence information of the terminal.

2. The method of claim 1, wherein the presence information is received through a positioning system or from the terminal.

3. The method of claim 1, wherein the presence information is received periodically.

4. The method of claim 1, wherein the presence information contains identification data that is individually allocated to the terminal and coordinate data indicating position coordinates of the terminal.

5. A method for updating presence information of a terminal by the terminal, the method comprising:
   transmitting presence information to a presence server, wherein the presence information comprises communication intention data being determined based on whether or not a staying time of the terminal is greater than or equal to a preset time interval, wherein the preset time interval is determined based on a location of the terminal and wherein the communication intention data indicates whether communication is possible or not;

determining whether the presence information is changed by movement of the terminal; and transmitting the changed presence information if the presence information is changed.

6. The method of claim 5, wherein the presence information is transmitted through a positioning system to the presence server.

7. The method of claim 6, wherein the presence information is transmitted periodically.

8. The method of claim 5, wherein the presence information contains identification data that is individually allocated to the terminal and coordinate data indicating position coordinates of the terminal.

9. A presence server, comprising:

a transceiver configured to transmit and receive signals; and a controller configured to:

receive presence information from a terminal, wherein the presence information comprises communication intention data being determined based on whether or not a staying time of the terminal is greater than or equal to a preset time interval, wherein the preset time interval is determined based on a location of the terminal, and wherein the communication intention data indicates whether communication is possible or not;

store the received presence information;

update the stored presence information if the presence information is different from previously stored presence information; and provide the presence information of the terminal to another terminal that requests the presence information of the terminal.

10. The presence server of claim 9, wherein the presence information is received through a positioning system or from the terminal.

11. The presence server of claim 9, wherein the presence information is received periodically.

12. The presence server of claim 9, wherein the presence information contains identification data that is individually allocated to the terminal and coordinate data indicating position coordinates of the terminal.

13. A terminal, comprising:

a transceiver configured to transmit and receive signals; and a controller configured to:

transmit presence information to a presence server, wherein the presence information comprises communication intention data being determined based on whether or not a staying time of the terminal is greater than or equal to a preset time interval, wherein the preset time interval is determined based on a location of the terminal, and wherein the communication intention data indicates whether communication is possible or not;

determine whether the presence information is changed by movement of the terminal; and transmit the changed presence information if the presence information is changed.

14. The terminal of claim 13, wherein the presence information is transmitted through a positioning system to the presence server.

15. The terminal of claim 13, wherein the presence information is transmitted periodically.

16. The terminal of claim 13, wherein the presence information contains identification data that is individually allocated to the terminal and coordinate data indicating position coordinates of the terminal.

* * * * *